E. N. ROTH.
HOSE COUPLING.
APPLICATION FILED MAR. 24, 1919.

1,346,425.

Patented July 13, 1920.
3 SHEETS—SHEET 1.

Witnesses:
W. E. Kilroy
Harry R. L. White

Inventor:
Edward N. Roth
by Bennett Numan
Attys.

E. N. ROTH.
HOSE COUPLING.
APPLICATION FILED MAR. 24, 1919.
1,346,425.
Patented July 13, 1920.
3 SHEETS—SHEET 2.
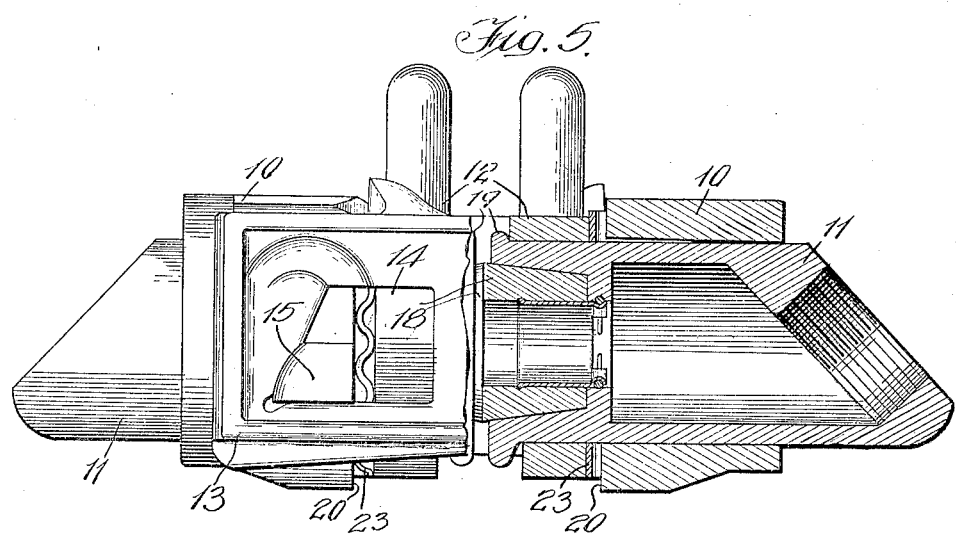
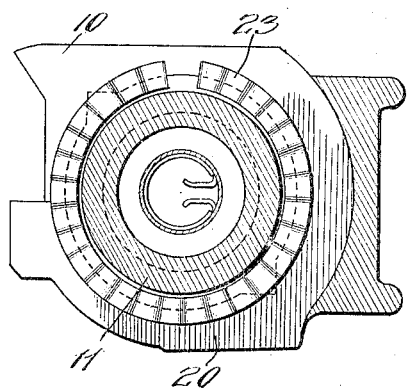
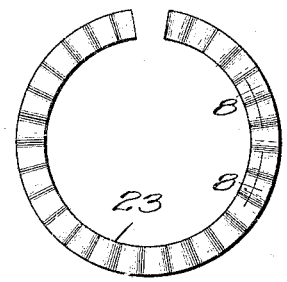

E. N. ROTH.
HOSE COUPLING.
APPLICATION FILED MAR. 24, 1919.
1,346,425.
Patented July 13, 1920.
3 SHEETS—SHEET 3.
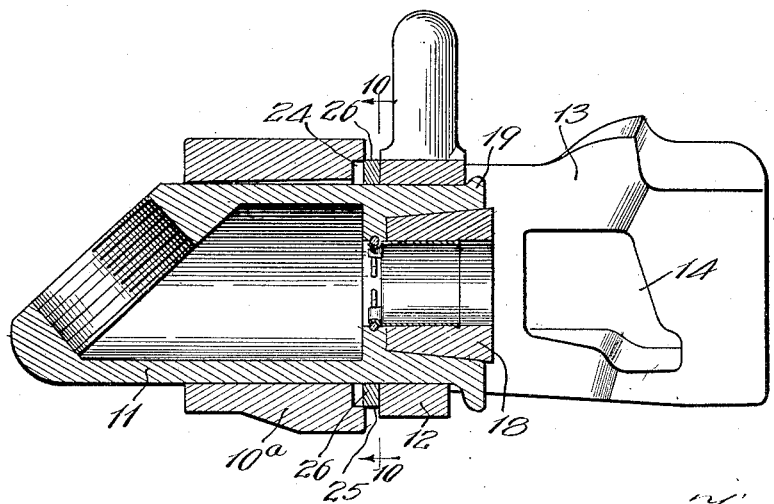
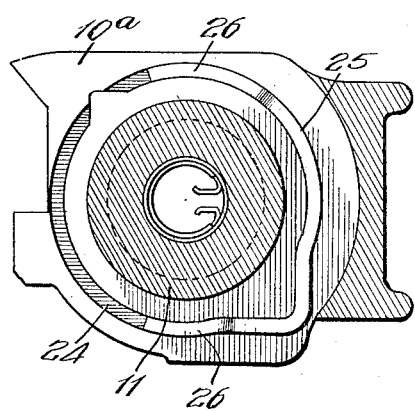
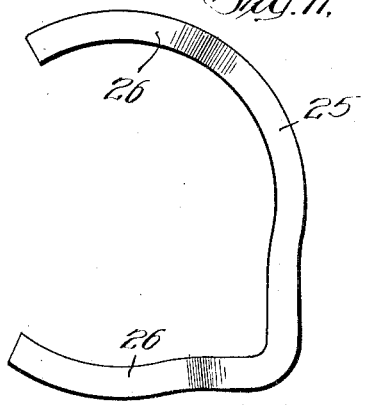
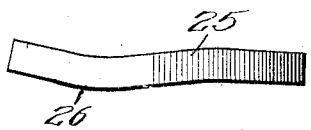
Witnesses:
W. T. Kilroy
Harry R. C. White
Inventor:
Edward N. Roth
By Barnett & Truman
Att'ys

UNITED STATES PATENT OFFICE.

EDWARD N. ROTH, OF CHICAGO, ILLINOIS, ASSIGNOR TO ROTH MANUFACTURING COMPANY, OF CHICAGO, ILLINOIS, A CORPORATION OF ILLINOIS.

HOSE-COUPLING.

1,346,425.   Specification of Letters Patent.   Patented July 13, 1920.

Application filed March 24, 1919. Serial No. 284,769.

*To all whom it may concern:*

Be it known that I, EDWARD N. ROTH, a citizen of the United States, residing at Chicago, in the county of Cook and State of Illinois, have invented certain new and useful Improvements in Hose-Couplings, of which the following is a specification.

My invention relates to a hose coupler, and more particularly to a railway steam train pipe hose coupler comprising two elements, one to interlock with the mating coupler and the other, the conduit member of the coupler which is adapted to be forced against such mating coupler, or its gasket, together with means, a cam ring or other wedging device, for example, for operating the conduit member. The primary object of the invention is to provide means for increasing the frictional engagement and providing a spring cushion between certain of the parts of the coupler to prevent a loosening movement thereof which is likely to otherwise occur because of vibration or other disturbing forces to which the coupling may be subjected when in service; this cushioning means also is intended to serve the purpose of preventing the breakage of the parts or the crushing of the coupler gaskets in case the wedging means should be driven home too hard.

The invention is illustrated, in certain preferred embodiments, in the accompanying drawings, modifications of which will suggest themselves to those skilled in this art.

In the drawings—

Fig. 5 is a view in elevation, with parts in section, of a pair of couplers in interlocked relation.

Fig. 6 is a view similar to Fig. 2, illustrating a modification.

Fig. 7 is a view, in detail, of the modified form of resilient cushioning device shown in Fig. 6.

Fig. 8 is a sectional view on line 8—8 of Fig. 7.

Fig. 9 is a view, similar to Fig. 1, showing another form of the invention.

Fig. 10 is a sectional view on line 10—10 of Fig. 9, and

Figs. 11 and 12 are detail views of the resilient cushioning device employed in this form of the invention.

Like characters of reference designate like parts in the several figures of the drawings.

Figure 1:
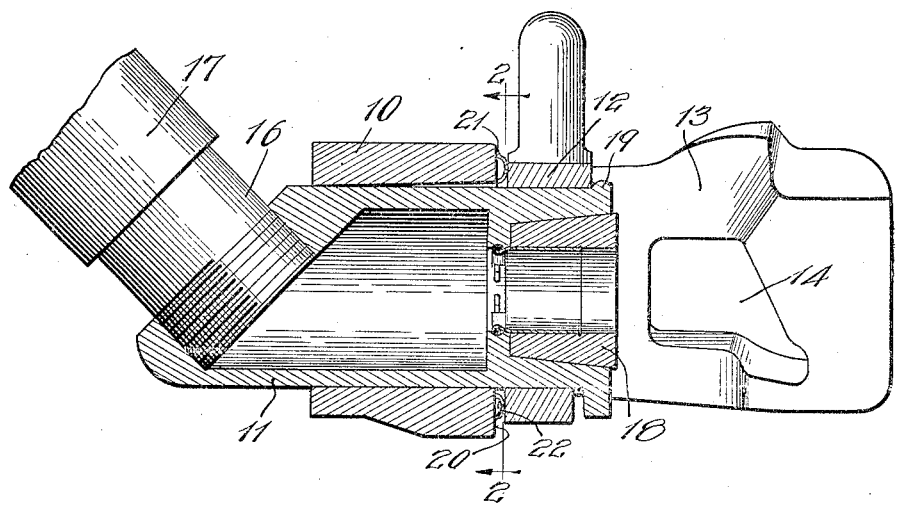
Figure 1 is a sectional view of a coupler of the type indicated provided with the improvement of my invention.
Figure 2:
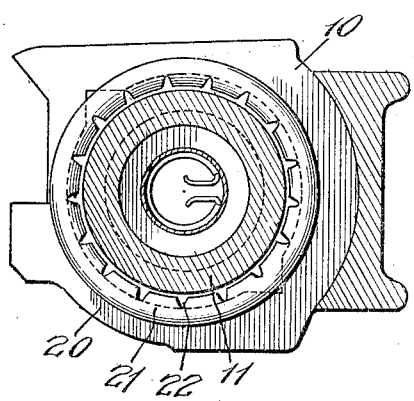
Fig. 2 is a sectional view on line 2—2 of Fig. 1.
Figure 3:
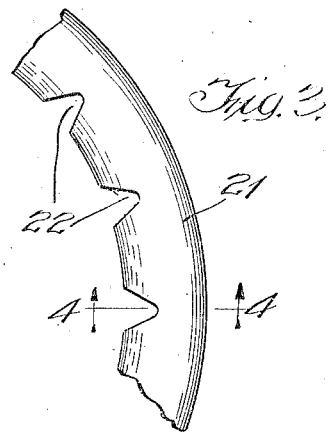
Fig. 3 is a fragmentary view of a preferred form of the resilient element used for obtaining the result desired.
Figure 4:
Fig. 4 is a cross sectional view, on line 4—4 of Fig. 3.

Referring first to Figs. 1 to 5 inclusive, the coupler comprises essentially three elements, a coupling member or coupler head 10, a conduit member 11 movable back and forth through the coupling member, and a wedging or cam ring 12 for operating the conduit member. The coupler head has an arm 13 formed with an opening 14 whereby the arm may be engaged with an undercut lug 15 on the side of the head of the mating coupler, as shown in Fig. 5. The conduit member is provided with a nipple 16 for attachment to the rubber hose 17 or other pipe connection. The conduit member is also shown as provided with a gasket 18 of the usual expansible type although any suitable gasket might be used in this connection. The cam ring 12 bears against a lug 19 on the conduit member. Its thrust is against a shoulder 20 on the coupling member. Between two of the coöperating elements of the coupler, preferably between the cam ring and shoulder 20 of the coupling member is a resilient cushioning element 21 which, in the form shown in Figs. 1 to 5 inclusive, is a ring curved in cross section as shown in Fig. 4 and formed with notches 22 on its inner edge. The ring is made preferably of steel or other spring metal and is quite stiff. Its resiliency, however, is increased by the notches 22.

It will be seen that a device of this sort increases the frictional engagement of the parts of the coupler so as to preserve the wedging relation of such parts as against a rotation of the cam ring in a reverse or loosening direction. Moreover, it provides a cushion for absorbing vibration to which a railway steam train pipe coupling is subjected because of its suspended position between the cars. Furthermore, the device will act as a take-up in case the trainman, who is likely to be careless in this respect, drives the cam ring home too hard, and prevent the breaking of some part of the coupler or the crushing of the gasket where a gasket of rubber composition, or the like, is used.

It will be understood that the location of the resilient or cushioning device with respect to the parts of the coupler may be varied and also that the form of such device is subject to modification. For example, with reference to the form of the device, I may employ an arcuate strip 23 just short of a complete circle, formed with radial corrugations to give it resiliency, as shown in Figs. 6, 7 and 8.

A different form of the invention is shown in Figs. 9 to 12 inclusive. The coupler head 10ª is formed with a groove 24 of irregular contour in which is seated a spring steel member 25 (Figs. 11 and 12) which is formed with bends 26, 26 at substantially diametrically opposite points adapted to bear against the cam ring 12. Operation of the cam ring to force the conduit member 11 toward the mating coupler tends to flatten out and compress the spring member 25.

I claim:

1. A hose coupler comprising, in combination, a coupling member adapted to engage a mating coupler, a conduit member movable in said coupling member, wedging means between said members, and a resilient element arranged to bear against said wedging means and to be stressed to cushion said parts and prevent a loosening of the wedging means.

2. A hose coupler comprising, in combination, a coupling member adapted to engage a mating coupler, a conduit member movable in said coupling member, a cam ring between said members, and a resilient element arranged to bear against said cam ring and to be stressed to cushion said parts and prevent a loosening movement of the cam ring.

3. A hose coupler comprising, in combination, a coupling member adapted to engage a mating coupler, a conduit member movable in said coupling member, a member for forcing said conduit member against said other coupler, and a resilient element arranged between said last mentioned member and one of the other members adapted to be compressed when the parts of the coupler are operatively connected with the mating coupler.

4. A hose coupler comprising, in combination, a coupling member adapted to engage a mating coupler, a conduit member movable in said coupling member, a member for forcing said conduit member against said other coupler, and a spring metal ring interposed between said last named member and one of the other members and bent so as to be flattened and put under stress when the couplers are operatively engaged.

5. A hose coupler comprising, in combination, a coupling member adapted to engage a mating coupler, a conduit member movable in said coupling member, a wedging member interposed between the aforesaid members, and a resilient element between the wedging member and one of the other members.

6. A hose coupler comprising, in combination, a coupling member adapted to engage a mating coupler, a conduit member movable in said coupling member, a cam ring interposed between said members, and a resilient element between the cam ring and one of said members.

7. A hose coupler comprising, in combination, a coupling member adapted to engage a mating coupler, a conduit member movable in said coupling member, a cam ring interposed between said members, and an annular spring metal element between the cam ring and the coupling member.

8. A hose coupler comprising a coupling member, a conduit member and a cam ring for producing relative movement between said coupling member and conduit member, the coupling member being formed with a recess in the portion thereof surrounding the conduit member, and a spring element seated in said recess and formed with bends adapted to bear against said cam ring.

EDWARD N. ROTH.